United States Patent
Shi et al.

(10) Patent No.: US 10,175,417 B2
(45) Date of Patent: Jan. 8, 2019

(54) THICK BACKLIGHT FOR RGB LED OF A LIQUID CRYSTAL DISPLAY USED IN A VIRTUAL REALITY HEAD MOUNTED DISPLAY

(71) Applicant: Facebook Technologies, LLC, Menlo Park, CA (US)

(72) Inventors: Jianru Shi, Union City, CA (US); Evan M. Richards, Santa Clara, CA (US); Yue Shi, Santa Clara, CA (US); Shie Ping Jeffrey Tseng, Los Altos, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 16 days.

(21) Appl. No.: 15/339,345

(22) Filed: Oct. 31, 2016

(65) Prior Publication Data

US 2018/0120497 A1    May 3, 2018

(51) Int. Cl.
*G02F 1/1335*    (2006.01)
*F21V 8/00*    (2006.01)

(52) U.S. Cl.
CPC ................. *G02B 6/0068* (2013.01)

(58) Field of Classification Search
CPC ................................ G02F 1/133615
See application file for complete search history.

(56) References Cited

U.S. PATENT DOCUMENTS

| 7,476,015 | B2 * | 1/2009 | Arai | G02B 6/0028 349/65 |
| 2006/0125773 | A1 * | 6/2006 | Ichikawa | G02F 1/133611 345/102 |
| 2008/0137007 | A1 * | 6/2008 | Chang | G02B 6/0068 349/65 |
| 2009/0213301 | A1 * | 8/2009 | Tanabe | G02B 6/0068 349/65 |
| 2011/0007524 | A1 * | 1/2011 | Nagatani | G02B 6/0061 362/616 |

* cited by examiner

*Primary Examiner* — Richard H Kim
(74) *Attorney, Agent, or Firm* — Fenwick & West LLP

(57) ABSTRACT

A liquid crystal display (LCD) device including a backlight with vertically stacked light emitting diodes (LEDs). The LCD device includes an LCD panel and a backlight for illuminating the LCD panel. The backlight includes a plurality of LEDs and a light guide. The plurality of LEDs are stacked vertically and disposed behind the LCD panel along one or more edges of the LCD panel. The plurality of LEDs include at least a first color LED and a second color LED emitting first light and second light at a first direction, respectively, at a first wavelength and a second wavelength, respectively. The light guide is disposed behind the LCD panel and adjacent to the plurality of LEDs. The light guide is configured to combine the first light and the second light received from the plurality of LEDs into combined light to illuminate the LCD panel.

20 Claims, 11 Drawing Sheets

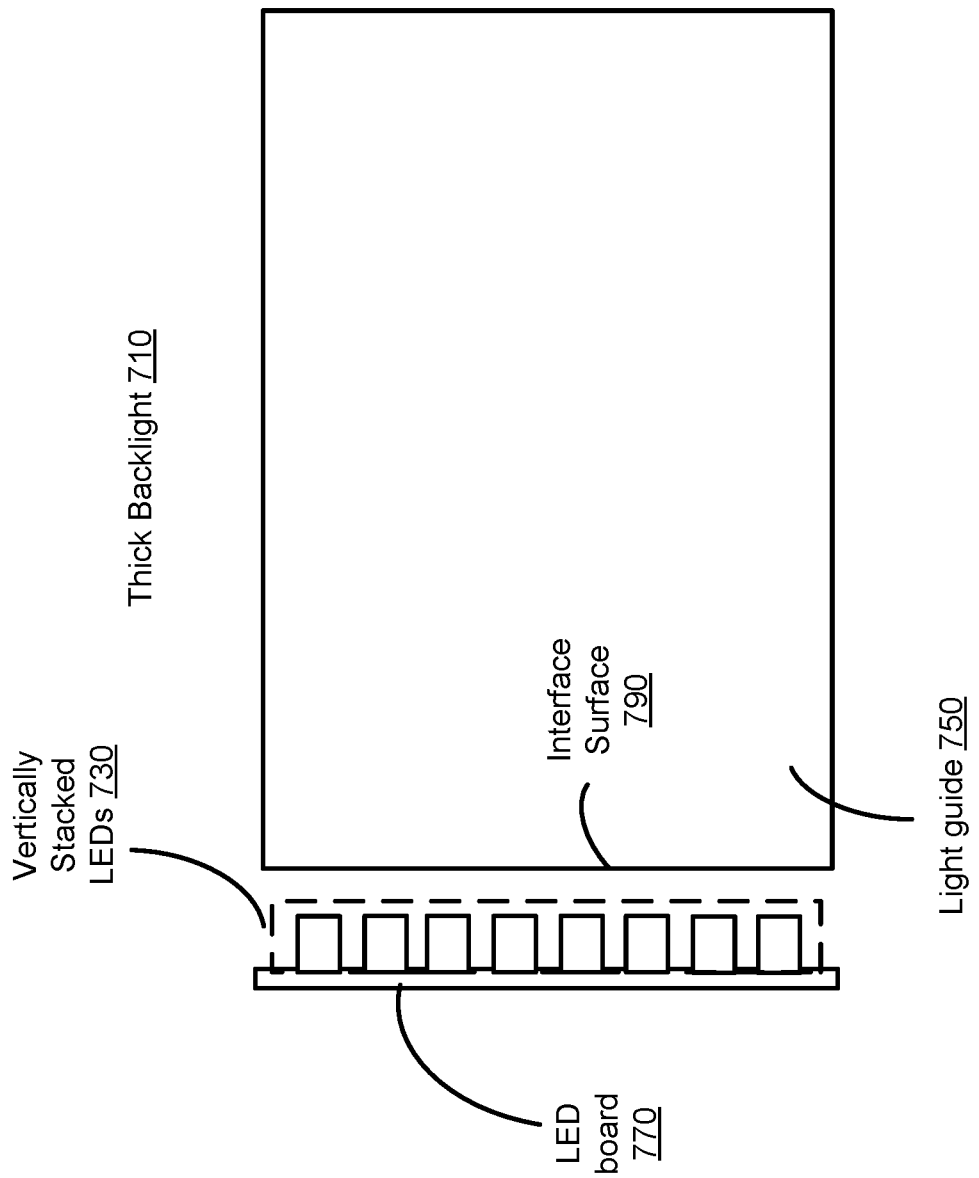

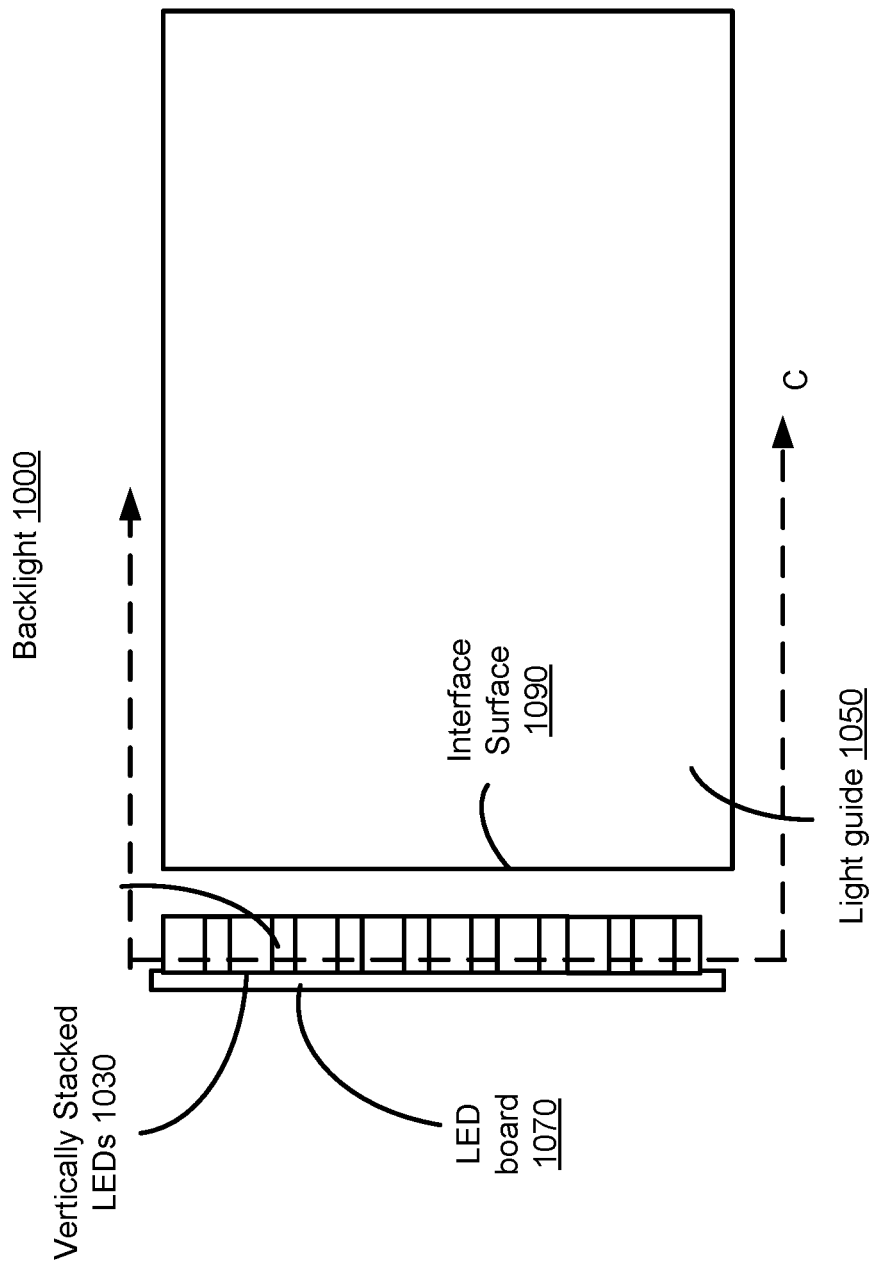

1200

Determine a first emission spectrum of a first color LED of a vertical stack of color LEDs and a second emission spectrums of a second color LED of the vertical stack of color LEDs
1210

Determine a first emission response time of the first color LED and a second emission response time of the second color LED
1220

Control the first emission spectrum of the first color LED relative to the second emission spectrum of the second color LED
1230

Control the first emission response time of the first color LED relative to the second emission response time of the second LED
1240

FIG. 12

THICK BACKLIGHT FOR RGB LED OF A LIQUID CRYSTAL DISPLAY USED IN A VIRTUAL REALITY HEAD MOUNTED DISPLAY

BACKGROUND

Edge-lit backlights provide illumination for pixels of liquid crystal displays (LCDs) to provide images on the LCD. These backlights may include a single layer of white LEDs arranged along an edge of a light guide. The light guide receives light from the white LEDs and attempts to direct the light evenly to pixels of the LCD panel of the electronic display. The single layer of white LEDs provides light having limited color gamut and brightness, making them less desirable for use as light sources for backlights for head mounted displays (HMDs).

SUMMARY

A liquid crystal display (LCD) device including a backlight with vertically stacked light emitting diodes (LEDs). In some embodiments, the LCD device includes an LCD panel and a backlight for illuminating the LCD panel. The backlight includes a plurality of LEDs and a light guide. The plurality of LEDs are stacked vertically and disposed behind the LCD panel along one or more edges of the LCD panel. The plurality of LEDs include at least a first color LED and a second color LED emitting first light and second light at a first direction, respectively, at a first wavelength and a second wavelength, respectively. The light guide is disposed behind the LCD panel and adjacent to the plurality of LEDs. The light guide is configured to combine the first light and the second light received from the plurality of LEDs into combined light to illuminate the LCD panel, and direct the combined light to the pixels of the LCD panel in a second direction.

Some embodiments include a head-mounted display (HMD) including an LCD device including a backlight with vertically stacked light emitting diodes (LEDs).

BRIEF DESCRIPTION OF THE DRAWINGS

FIG. 8 shows a front view of a backlight of the electronic display shown in FIG. 7, in accordance with some embodiments.

FIG. 10 shows a front view of a backlight including LEDs vertically stacked with offsets, in accordance with some embodiments.

FIG. 12 shows a flow chart of a process for controlling vertically stacked LEDs of a backlight, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Techniques for providing a backlight optimized for head-mounted displays (HMD) are discussed herein. The backlight is disposed behind a liquid crystal display (LCD) device along a thickness dimension to illuminate the pixels of an LCD panel. The backlight includes light emitting diodes (LEDs) stacked vertically and disposed behind the LCD panel along one or more edges of the LCD panel. The LEDs include different color LEDs that emit light at different wavelengths. For example, the LEDs may include red, green, and blue LEDs that can collectively produce a white light. "Stacked vertically" refers to stacking of LEDs along the thickness dimension.

The LEDs may be arranged along one or more edges (e.g., left, right, top, or bottom) of the LCD display to provide light to the LCD panel. The white light output from the stacked edge LEDs is passed through a variety of optical elements (e.g., a light guide, reflective polarizer, etc.), and is directed substantially evenly across pixels of the LCD panel.

The color LEDs of different output wavelength are separately optimized based on wavelength spectrum intensity and emission response time. The spectrum intensity of each LED may be controlled to create combined light having wider color gamut than light from only white LEDs. Furthermore, the stacking of LEDs along the thickness dimension of the LCD panel enhances brightness. While not limited to HMDs, the enhanced color gamut and brightness of the backlight are advantageous for use in HMDs.

The vertically stacked LEDs of the backlight may be packaged in various ways. For example, two or more vertically stacked LEDs may be in separate LED assemblies. In another example, two or more vertically stacked LEDs may be in the same LED assembly.

In some embodiments, vertically stacked LEDs improve the uniformity of the backlight and reduce hotspots. A hotspot can be caused by large distances between adjacent light sources of the same color, which results in non-uniform distribution of light on the pixels of the LCD panel. The backlight includes first array of LEDs vertically stacked with a second array of LEDs, where the first array of LEDs are stacked with an offset relative to the second array of LEDs. The offset between the vertically stacked arrays reduces the distance between adjacent LED light sources, resulting in a reduction in hotspots.

System Overview

Figure 1:
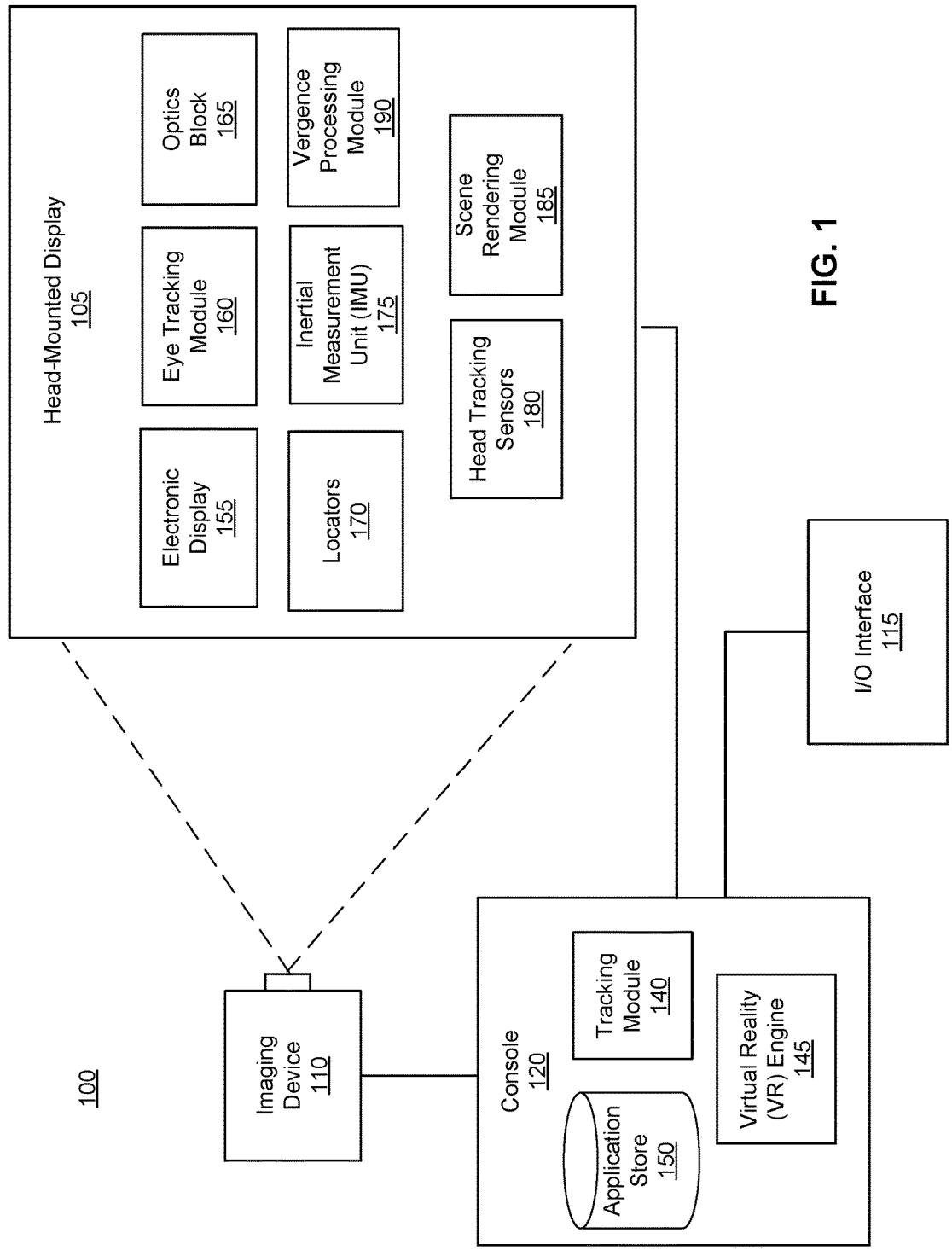
FIG. 1 shows a system, in accordance with some embodiments.

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and a I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 165, an internal measurement unit (IMU) 170, head tracking sensors 175, and a scene rendering module 180, and a vergence processing module 190.

The electronic display 155 includes an LCD device including a LCD panel and a backlight. The backlight includes vertically stacked color LEDs, as discussed in greater detail below.

The optics block 165 adjusts its focal length responsive to instructions from the console 820. In some embodiments, the optics block 165 includes a multi multifocal block to adjust a focal length (adjusts optical power) of the optics block 165

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 215 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g. information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane.

The VR engine 145 uses the focal information to determine settings for one or more SHWPs, one or more active liquid crystal lenses, or some combination thereof, within the optics block 176 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
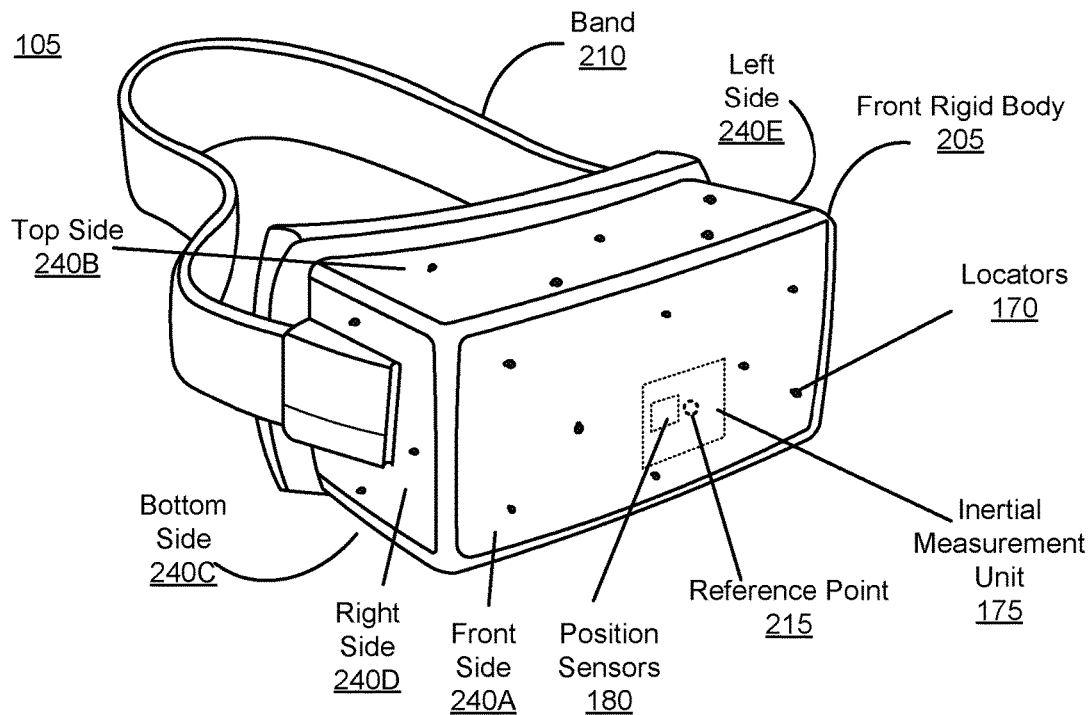
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
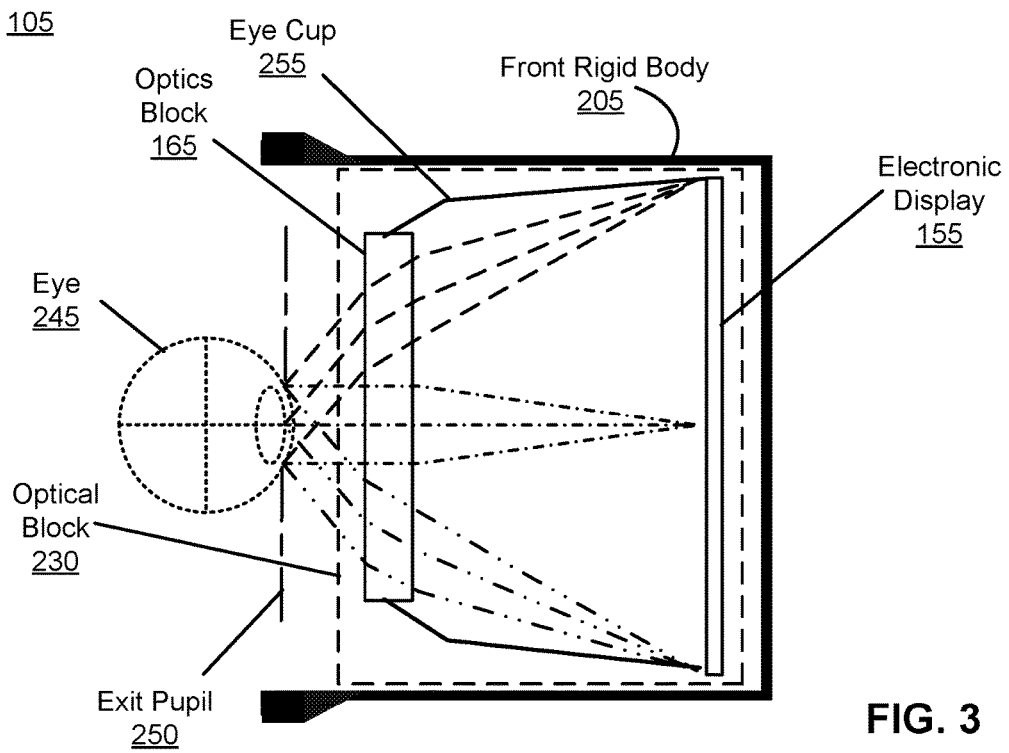
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes an optical block 230 that provides altered image light to an exit pupil 250. The exit pupil 250 is the location in the front rigid body 205 where a user's eye 245 is positioned. For purposes of illustration, FIG. 3 shows a cross section associated with a single eye 245, but the HMD 105 may include another optical block that provides altered image light to another eye of the user.

The optical block 230 includes the electronic display 155, the optics block 165, and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 164 directs the image light to the exit pupil 250 for presentation to the user. In some embodiments, the optics block 165 and the eye cone 255 may be omitted from the optical block 230.

Figure 4:
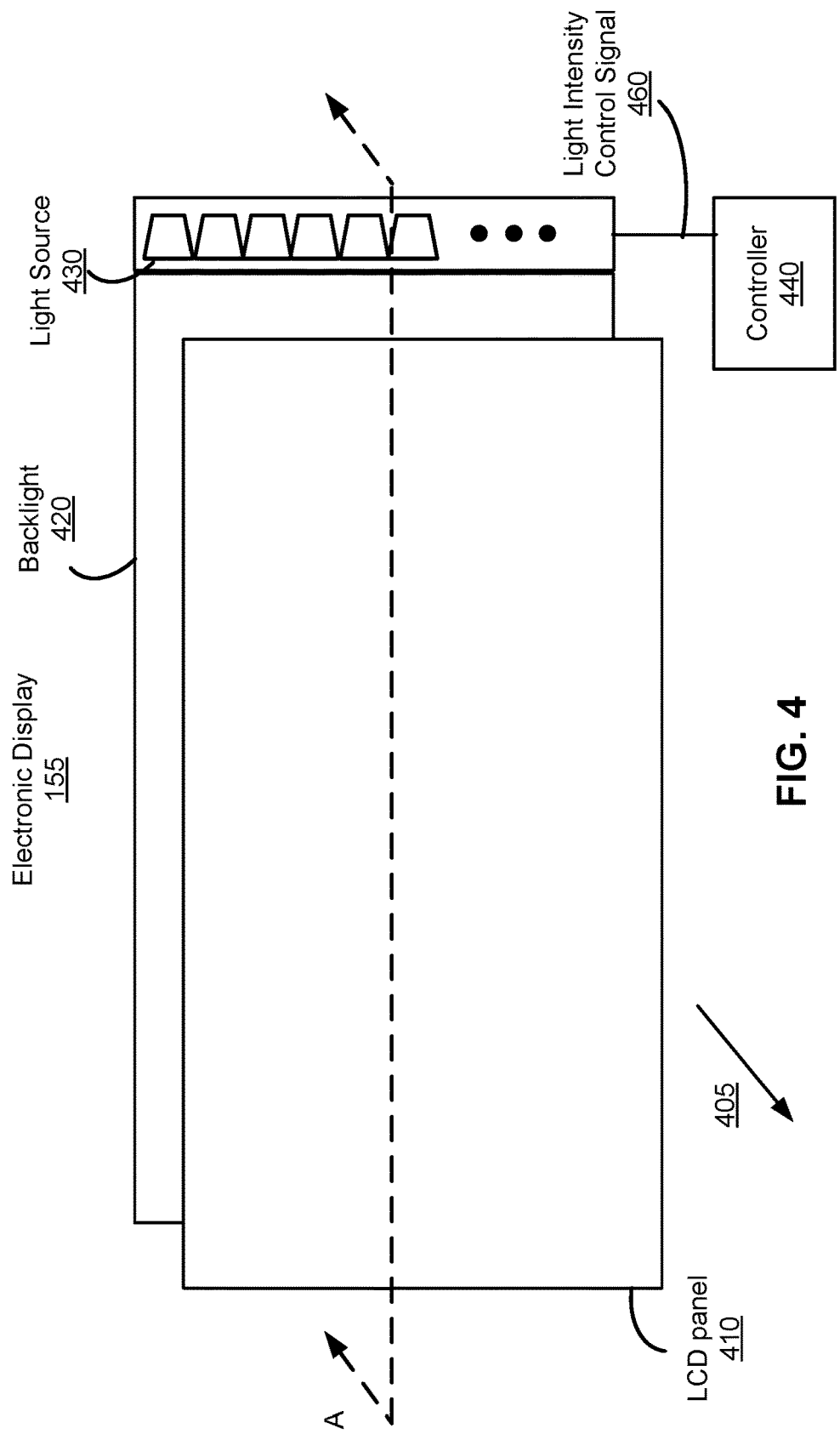
FIG. 4 shows an exploded front view of an electronic display, in accordance with some embodiments.

FIG. 4 shows an exploded front view of an example of an electronic display 155. Although the HMD 105 may include various types of displays, the electronic display 155 in this embodiment is a LCD device including a liquid crystal display (LCD) panel 410, a backlight 420, and a controller 440. The backlight 420 emits light towards the exit pupil 250 through the LCD panel 410 in a direction 405. The LCD panel 410 is disposed between the backlight 420 and the exit pupil 250, and controls an amount of light from the backlight 420 to pass through in the direction 405 on a per pixel basis. A space between the LCD panel 410 and the backlight 420 may be vacuum or filled with transparent material. In other embodiments, the electronic display 155 includes different, or fewer components than shown in FIG. 4.

The backlight 420 includes light sources 430 that generate light. The light sources 430 in this embodiment include vertically stacked LEDs of different color or spectrum intensities (e.g., R, G, and B) that can be separately controlled and optimized to desired spectrum intensities and emission response times. The spectrum intensity of each LED of the light sources 430 may be chosen to collectively produce combined light having wider color gamut and/or brightness than white light from white LEDs.

The intensity (e.g. over time) of light from a light source 430 is adjusted according to a light intensity control signal 460 from the controller 440. In some embodiments, the backlight 420 may be a strobed backlight where vertically stacked LEDs are switched on and off over time (e.g., according to a duty cycle). The light intensity control signal is a signal indicative of intensity of light to be output for each light source 430. Different colored light sources 430 can output corresponding light with different intensity, according to the light intensity control signal. For example, a red light source outputs red light with an intensity corresponding to '10' out of '255', a green light source outputs green light with an intensity corresponding to '30' out of '255', and a blue light source outputs blue light with an intensity corresponding to '180' out of '255,' according to the light intensity control signal. A light source may adjust its duty cycle of or an amount of current supplied to LEDs according to light intensity control signals. For example, reducing current supplied to the LED or reducing 'ON' duration of the duty cycle renders intensity of light from a light source to be reduced (i.e., light to be dimmed).

In some embodiments, the controller 440 is configured to optimize an emission spectrum of the combined light from the light sources 430 based on separately controlling the emission spectrums of differently colored LEDs 430. The emission spectrum of a first color LED may be controlled relative to the emission spectrum of a second color LED. In some embodiments, the controller 440 is configured to optimize input signals to the differently colored LEDS to balance the emission response times of the differently colored LEDs. The emission response of a first color LED may be controlled relative to the emission response time of a second color LED. The optical elements (not shown in FIG. 4 but shown in FIG. 5) of the backlight 420 receive light from the light sources 430, and create combined light having a color corresponding to a combination of colors of the received light.

Figure 5:
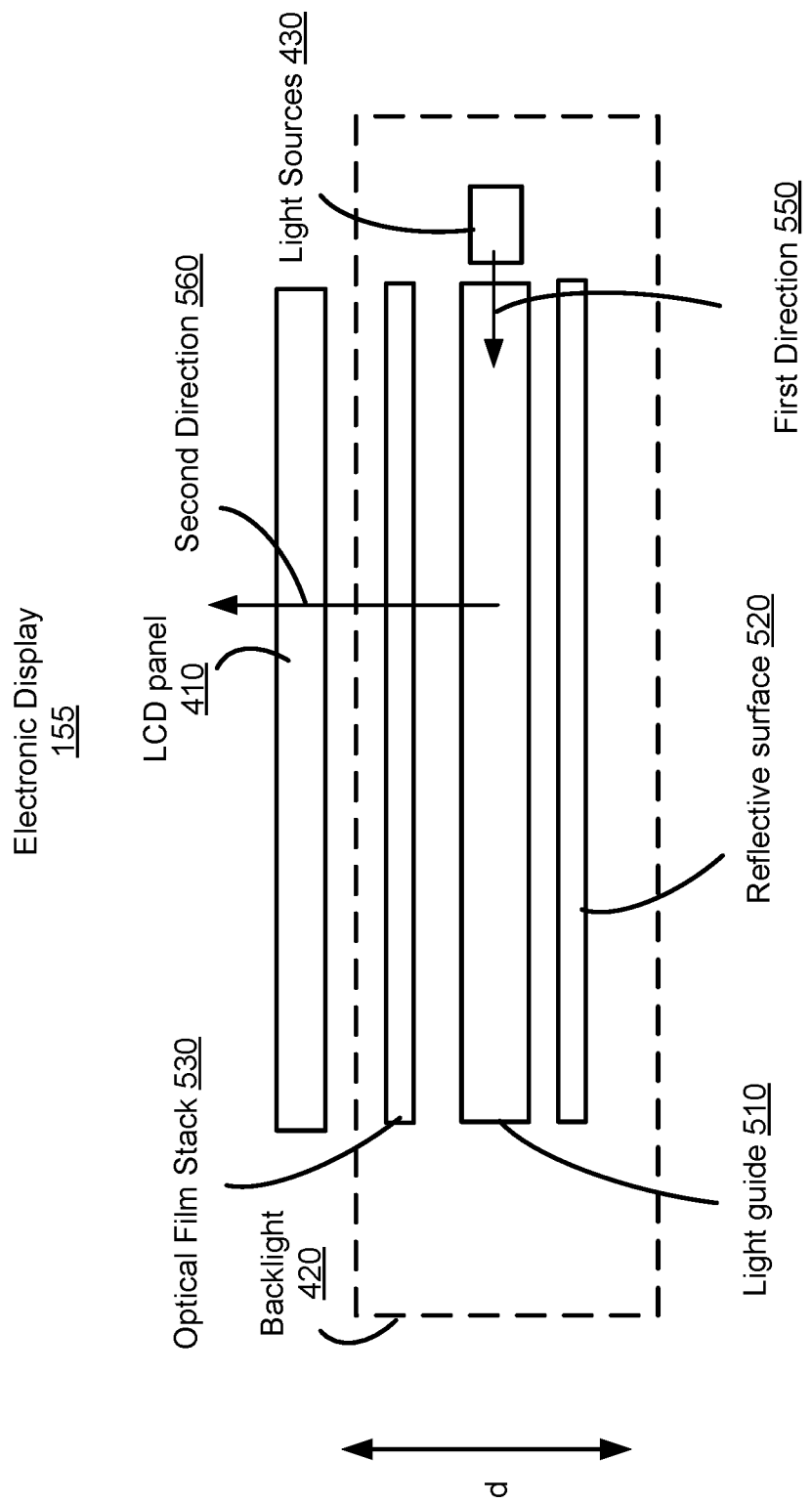
FIG. 5 shows a cross sectional side view of the electronic display, in accordance with some embodiments.

FIG. 5 shows a cross sectional side view of the electronic display 155, in accordance with some embodiments. The cross sectional side view is taken along line A for the electronic display 155 as shown in FIG. 4. The backlight 420 is disposed behind the LCD panel along a depth dimension d. The backlight 420 includes light sources 430, a light guide 510, a reflective surface 520, and an optical film stack 530. The light guide 510 may be composed of a glass material or a transparent plastic material, and refractive and/or reflective components for receiving light from the light sources 430 in a first direction 550 and projecting light towards the LCD panel 410 in a second direction 560. For example, the light guide 510 may include a structure having a series of unevenly spaced bumps that diffuse propagating light. The density of the bumps increase with distance to the light sources 430 according to a diffusion equation. The light guide 510 receives light with different colors from the light sources 430, and directs combined light including a combination of the different colors in a different direction toward the LCD panel 410 to illuminate the LCD panel 410. The combined light includes improved spectrum intensity across different wavelengths, as described in detail below with respect to FIGS. 6A and 6B.

The light sources 430 include a plurality of LEDs disposed along one or more edges of the LCD panel 410 to provide edge-lighting for the backlight 420. In some embodiments, the light sources 430 may include vertically stacked LEDs, as discussed in greater detail below.

The optical film stack 530 may be disposed between the light guide 510 and the LCD panel 410. The optical film stack 530 may include a diffuser that facilitates the uniform distribution of light from the light guide 510 across the pixels of the LCD panel 410. The optical film stack 530 may additionally or alternatively include a reflective polarizer film that reflects unpolarized light back toward the LCD panel 410 that would otherwise be absorbed.

The light guide 510 directs light towards its top and bottom surfaces, where the top surface faces the LCD panel 410 and the bottom surface faces the reflective surface 520. The reflective surface 520 includes an optical mirror that reflects light directed from the bottom surface of the light guide 510 towards the LCD panel 410.

Returning to FIG. 4, the LCD panel 410 receives a liquid crystal control signal from the controller 440, and passes light from the backlight 420 towards the exit pupil in the direction 405, according to the liquid crystal control signal. The liquid crystal control signal is a signal indicative of an amount of light to be passed through a liquid crystal layer of the LCD panel 410 for different pixels. The LCD panel 410 includes a plurality of liquid crystals, and an orientation of the liquid crystals can be changed according to the light crystal control signal applied across electrodes of the liquid crystal layer.

The controller 440 is a circuitry that receives an input image data, and generates control signals for driving the LCD panel 410 and the LED light sources 430. The input image data may correspond to an image or a frame of a video in a virtual reality and/or augmented reality application. The controller 440 generates the light intensity control signal for controlling intensity of light output by the light sources 430. In addition, the controller 440 generates the liquid crystal control signal to determine an amount of light passing from the backlight 420 towards the exit pupil 250 through the LCD panel 410 according to the input image data. The controller 440 provides the light intensity control signal to the light sources 430, and the liquid crystal control signal to the liquid crystal layer 410 at a proper timing to display a single image.

Figure 6A:
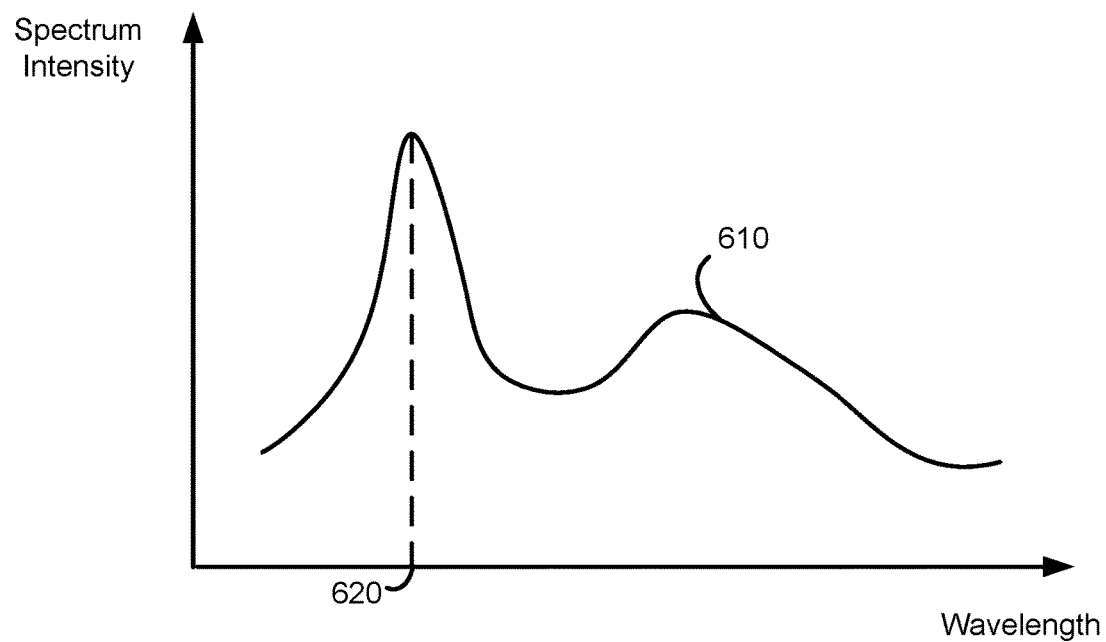
FIG. 6A shows a spectrum intensity of white light generated by a single white LED, in accordance with some embodiments.

FIG. 6A shows an exemplary spectrum intensity of white light generated by a single white LED. A spectrum intensity plot 610 represents spectrum intensity across different wavelengths (or frequency). The white light generated by the white LED single light source has varying light intensity across different wavelengths. For example, the spectrum intensity plot 610 has a peak at a wavelength 620, and has lower spectrum intensity at other wavelengths. A white LED may include a blue LED with a yellow phosphor coating, with the peak 620 corresponding with blue wavelengths. Accordingly, some color components corresponding to the other wavelengths may have reduced intensity than a color component corresponding to the wavelength 620. Put another way, the color gamut of the white LED is sub-optimal, which can result in color distortion when light from the white LED is passed through the LCD panel 410.

Figure 6B:
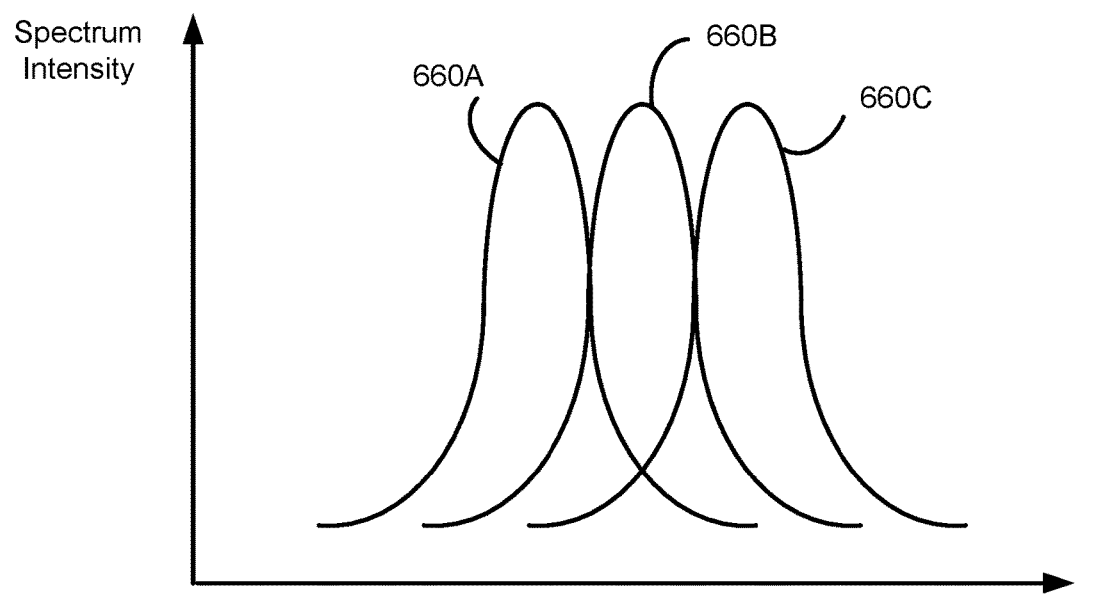
FIG. 6B shows spectrum intensity of white light generated by a combination of separate red, green, and blue LEDs, in accordance with some embodiments.

FIG. 6B shows spectrum intensity of white light generated by separate red, green, and blue LEDs, in accordance with some embodiments. The spectrum plot 660A represents spectrum intensity of blue light output by a blue light source, a spectrum plot 660B represents spectrum intensity of green light output by a green light source, and a spectrum plot 660C represents spectrum intensity of red light output by a red light source. As shown by the spectrum plots 660A, 660B, and 660C, the differently colored light sources emit light with similar intensity at corresponding wavelengths, either by their physical design or via control of input signals (e.g., larger driving current for lower efficiency LEDs to achieve uniform intensity levels, or other desired intensity levels). Light from the different light sources results in a combined light. Thus, improved colors, for example, in red, green, blue, cyan, magenta, yellow and black can be displayed. As a result, the color gamut or color purity displayed on the electronic display device can be improved.

Vertically Stacked LEDs for Backlight

Figure 7:
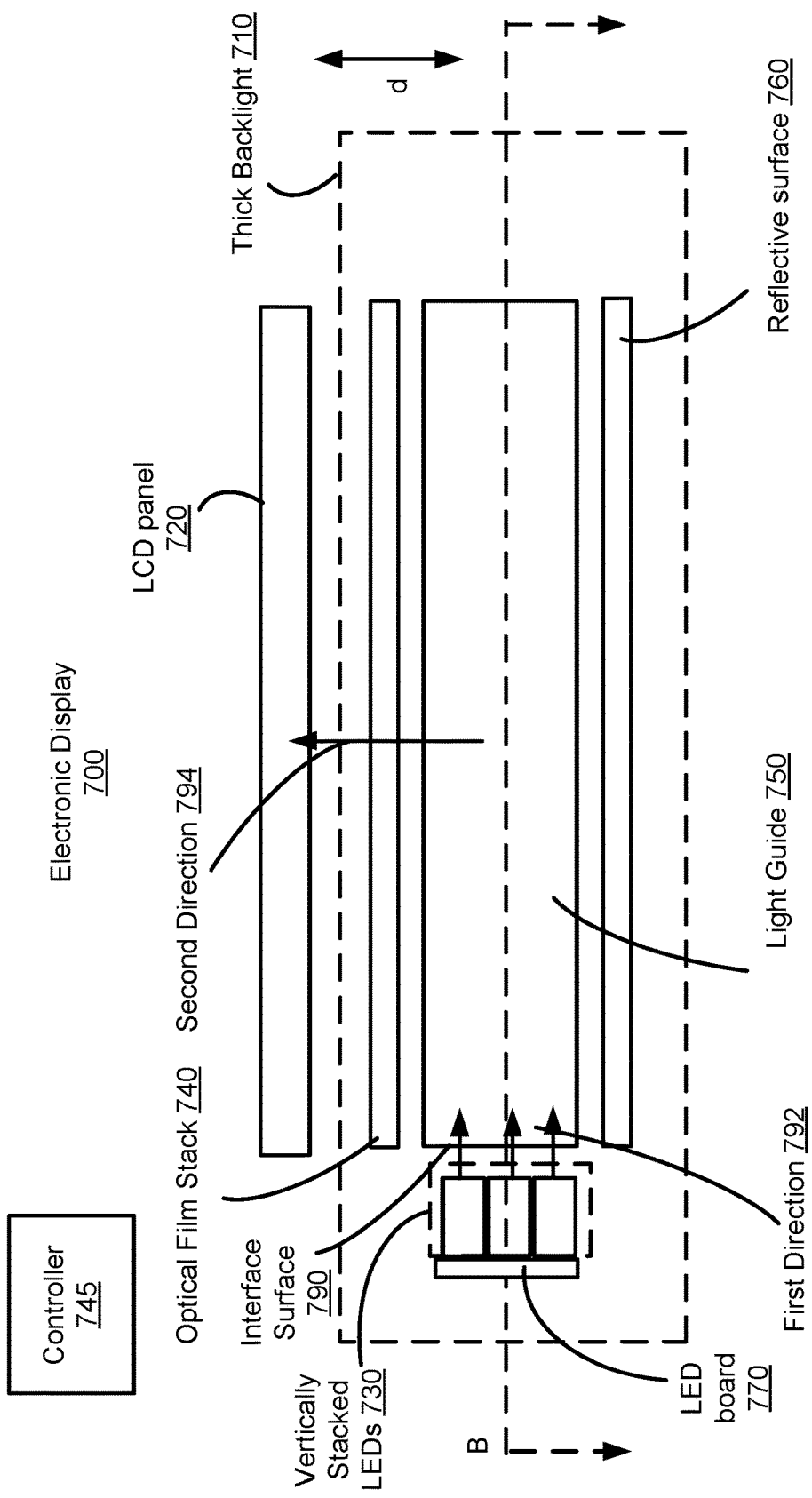
FIG. 7 shows a cross sectional side view of an electronic display, in accordance with some embodiments.

FIG. 7 shows a cross sectional side view of an electronic display 700, in accordance with some embodiments. The electronic display 700 is an LCD device, and is an example of an electronic display 155 that can be incorporated within an HMD 105. The electronic display 700 includes a backlight 710, a LCD panel 720, and a controller 745. The backlight 710 is disposed behind the LCD panel 720 along a depth (or "thickness") dimension d of the electronic display 700.

The backlight 710 is an edge-lit LED backlight that includes vertically stacked LEDs 730, an optical film stack 740, a light guide 750, and a reflective surface 760. Two or more LEDs 730 may be vertically stacked. In some embodiments, an LED board 770 mechanically and electrically connects two or more vertically stacked LEDs. In the embodiment shown in FIG. 7, three LEDs 730 are vertically stacked on top of each other along the depth dimension d.

The vertically stacked LEDs 730 emit light in a first direction 792, which is combined and directed in a second direction 794 by the light guide 750 toward the LCD panel 720. The vertically stacked LEDs 730 includes separately controllable color LEDs. For example, the LEDs 730 may include least a first color LED and a second color LED emitting first light and second light at a first direction, respectively, at a first wavelength and a second wavelength, respectively. In some embodiments, the LEDs 730 may include a red, green and blue LED that respectively generates a red, green, and blue emission spectrum (e.g., as shown by spectrum plots 660A, 660B, and 660C in FIG. 6A). By combining colored light from the vertically stacked LEDs 730, combined light can be created that has a spectrum plot 690 shown in FIG. 6B. The combined light can have a wide color gamut or relatively flat intensity for a wide range of wavelengths.

The light guide 750 is disposed behind the LCD panel along the depth dimension d, and adjacent to the vertically stacked LEDs 730.

FIG. 8 shows a front view of the backlight 710 of the electronic display 700 taken along the line B shown in FIG. 7. Multiple vertically stacked LEDs 730 are arranged adjacently along an edge of the light guide 750 and LCD panel. In the embodiment of FIG. 8, the vertically stacked LEDs 730 are arranged in an evenly spaced array at the left edge of the LCD panel. In various embodiments, vertically stacked LEDs 730 may be arranged along one or more edges of the LCD panel, such as the left, right, top, and/or bottom edges.

The LED board 770 may be a printed circuit board (PCB) and serves a substrate for mechanical attachment and electrical connection of the LEDs 730 into the stacked configurations discussed herein. In some embodiments, multiple vertically stacked LEDs 730 may share a LED board 770. The LED board 770 may be connected with the controller 745 to provide light intensity control signals from the controller 745 to the vertically stacked LEDs 730. In some embodiments, the LED board 770 may include a flexible PCB.

The light guide 750 combines the colored light received from the stacked LED assemblies into a combined light, and directs the combined light to the pixels of the LCD panel 720. The light guide 750 uniformly distributes the light the pixels of the LCD panel 720. The light guide 750 may be thicker than conventional light guides for edge-lit backlights because the structure is configured to efficiently couple with light from the vertically stacked LEDS 730. The vertically stacked LEDS 730 include multiple (e.g., 2, 3, 4, etc.) LEDs stacked on top of each other long the depth dimension d, as shown in FIG. 7. The combined light beam from a vertical stack of LEDS 730 projects a larger surface area on interface surface 790 of thick light guide 750 relative to a beam from a single non-stacked LED, and thus the thickness (along the dimension d) of the light guide 750 is adjusted to accommodate the vertically stacked LEDS 730. To optimize beam coupling and energy efficiency, the light guide 750 is thicker along the dimension d than conventional light guides that support single layer edge-lit LEDs. For HMDs, the thicker dimension of the backlight is less of a concern than for other devices with backlights such as mobile devices or stand-alone displays. For example, mobile devices are conventionally designed to minimize thickness to increase portability and aesthetics. The increased thickness of the backlight discussed herein may be incorporated within the front rigid body of the HMD. Because the front rigid body is thicker (e.g., to accommodate the optics block), the increased thickness of the backlight does not require a large change in the dimensions of the HMD.

FIGS. 9A-9D show examples of vertically stacked LEDs. As discussed above, two or more differently colored LEDs that can be separately controlled with electrical control signals may be vertically stacked on top of each other. For example, at least one red LED (e.g., spectrum plot 660C in FIG. 6B), green LED (e.g., spectrum plot 660B), and blue LED (e.g., spectrum plot 660C) may be vertically stacked such that the vertically stacked LEDs generate a combined light (e.g., spectrum plot 690) with wide color gamut and high brightness. Vertically stacked LEDs may be in separate LED assembly or packaging, or may be combined into a single LED assembly. Vertically stacked LEDs may be connected with an LED PCB 902, which is connected with the anodes and cathodes of the LEDs and provides electrical control signals from the controller to the LEDs. In some embodiments, the vertically stacked LEDs are mounted to a bezel or some other structure and electrically connected with the controller by wiring, and the LED board 902 is not used.

When used, the LED board 902 serves as a bus to provide power and control signals for connected stacked LEDs. In some embodiments, the LED board 902 may include a red line configured to transmit electrical control signals to anodes of red LEDs, a blue line configured to transmit electrical control signals to anodes of blue LEDs, and a green line configured to transmit electrical control signals to anodes of green LEDS. The LED board 902 may further include a cathode line connected with the cathodes of the red, green, and blue LEDs.

Figure 9A:
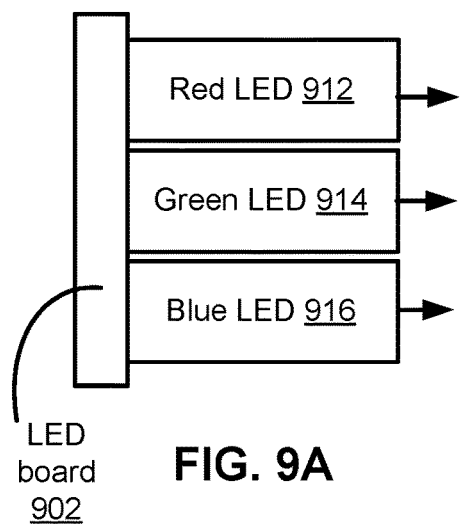
FIGS. 9A-9D show examples of vertically stacked LEDs, in accordance with some embodiments.

With reference to FIG. 9A, vertically stacked LEDs 910 includes a red LED 912, a green LED 914, and a blue LED 916. Each LED 912-916 is a separate LED assembly, and the LEDs 912-916 are stacked on top of each other (e.g., not necessarily in the order shown). Each LED 912-916 is a single color LED including an anode and a cathode that are connected with the LED board 902.

Figure 9B:
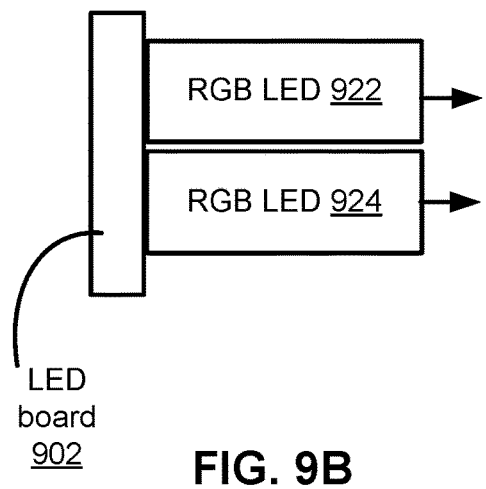

With reference to FIG. 9B, vertically stacked LEDs 920 includes RGB LEDs 922 and 924. Each RGB LEDs 922 and 924 includes a red, green, and blue LED incorporated within a single LED assembly. The RGB LEDs 922 and 924 include separately controllable red, green, and blue light outputs. For example, each RGB LED may include separate red, green, and blue anodes, and a common cathode. Multiple RGB LEDs may be vertically stacked on top of each other to increase brightness of light output from the vertically stacked LEDs 920. The red, green, and blue anodes across multiple stacked RGB LEDs may be connected with each other and to the LED board 902 (e.g., red, green, and blue lines). The cathodes across multiple stacked RGD LEDs may also be connected with each other, and to the LED board 902.

In some embodiments, a backlight may include vertically stacked RGB LEDs arranged into two or more layers, where each layer includes an array of RGB LEDs. For example, the RGB LED 922 is an LED of a first layer array, and the RGB LED 924 is an LED of a second layer array. The first layer is vertically positioned over the second layer, and the arrays may include an offset, as discussed in greater detail below. The first and second layers of RGD LEDs may share a LED board 902, or each layer may use a separate LED board.

Figure 9C:
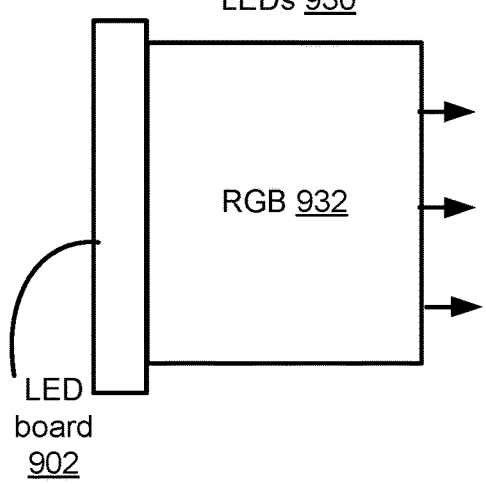

With reference to FIG. 9C, vertically stacked LEDs 930 includes a single high power RGB LED package 932. The RGB LED 932 may include separately controllable red, green, and blue light outputs in a single LED package. The thick RGB LED package 932 is able to produce colored light at a higher brightness than a single RGB LEDs 922 and 924. The RGB LED 932 may include red, green, and blue anodes, and a cathode. In some embodiments, the RGB LED 932 includes multiple RGB LEDs incorporated into a LED assembly.

Figure 9D:
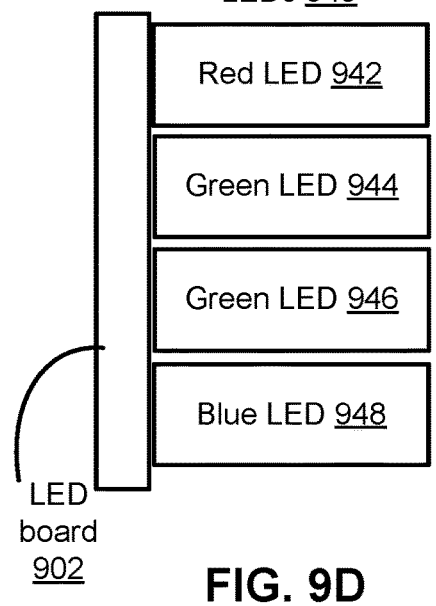

With reference to FIG. 9D, vertically stacked LEDs 940 includes a red LED 942, green LED 944, blue LED 948, and further includes an additional green LED 946. An additional green LED is incorporated into the stack because of the lower quantum efficiency for the green LED relative to the red or blue LEDs. In general, one or more additional color LEDs may be added to a vertical stack to achieve a desired emission spectrum for combined light.

Vertically Stacked LEDs with Offset for Hotspot Reduction

Referring back to FIG. 8, vertically stacked LEDs 730 are arranged in an evenly spaced array at an edge of the LCD panel. A hotspot can be caused by large distances between edge-lit LEDs, which results in non-uniform distribution of light on the pixels of the LCD panel. In some embodiments, vertically stacked LEDs may be arranged into multiple offset arrays to reduce the distance between vertically stacked LEDs.

Figure 11:
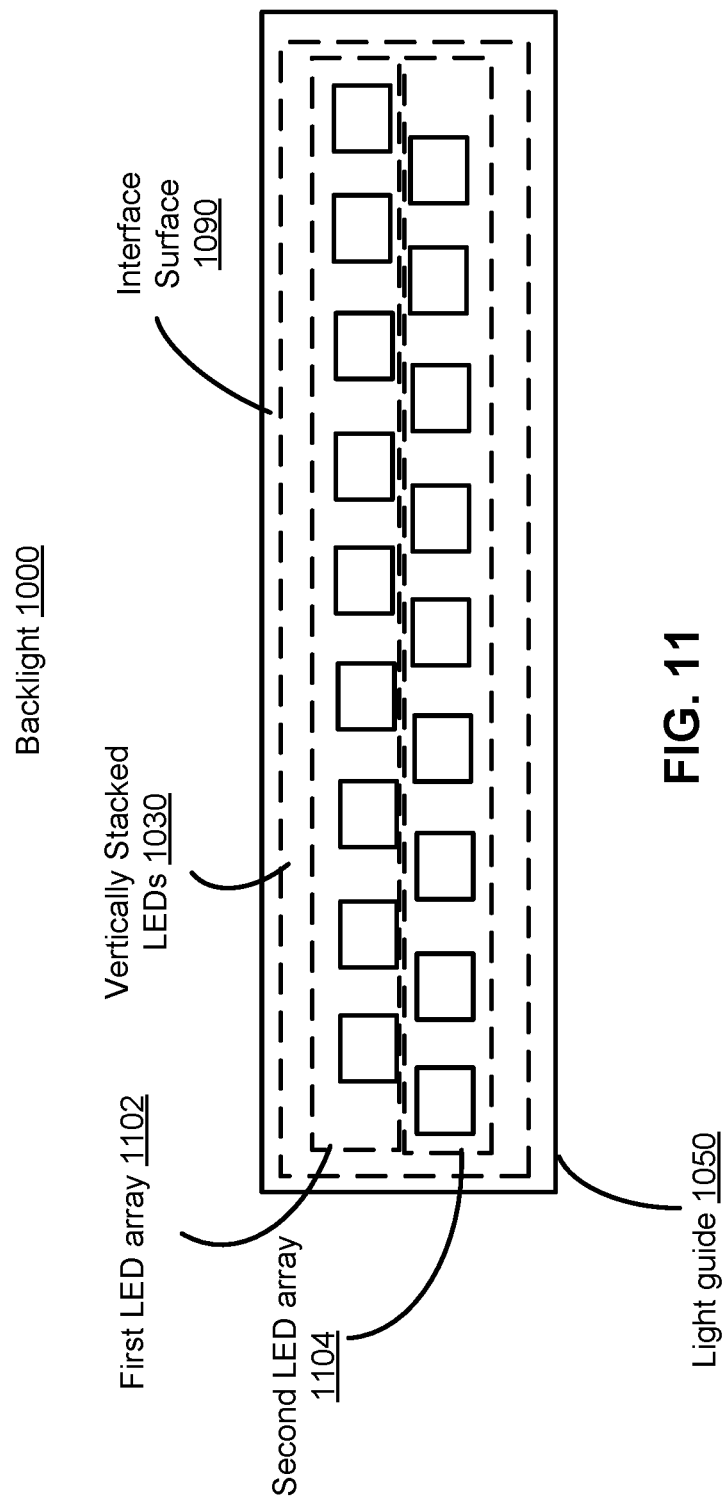
FIG. 11 shows a cross sectional side view of the backlight including LEDs stacked with offsets shown in FIG. 10, in accordance with some embodiments.

FIG. 10 shows a front view of a backlight 1000 including LEDs vertically stacked with offsets. The backlight 1000 includes a light guide 1050 including an interface surface 1090, and vertically stacked LEDs 1030. The vertically stacked LEDs 1030 may be coupled with a controller via one or more LED boards 1070. FIG. 11 shows a cross sectional side view of the backlight 1000 shown in FIG. 10 taken along the line C. With reference to FIG. 11, the vertically stacked LEDs 1030 include a first array of LEDs 1102 vertically stacked with a second array of LEDs 1104. The first array of LEDs 1102 stacked with an offset relative to the second array of LEDs 1104. For example, the first and second array of LEDs 1102 and 1104 are stacked such that the center of first array LEDs align with the space between adjacent second array LEDs. The distance between adjacent LEDs is effectively reduced, and thus the occurrence of hotspots is also reduced.

In some embodiments, the LEDs of the first and second LED arrays 1102 and 1104 shown in FIG. 11 each include multiple vertically stacked LEDs. Each set of vertically stacked LEDs may include different color LEDs, such as a green LED, a blue LED, and a red LED. In another example, each set of vertically stacked LEDs may include two or more RGB LEDs. In yet another example, the LEDs of the first and second LED arrays 1102 and 1104 shown in FIG. 11 each include a single RGB LED.

In some embodiments, the first LED array 1102 includes first color LEDs, the second LED array 1104 includes second color LEDs. The backlight 1000 may further include a third LED array that includes third color LEDs.

Control of Vertically Stacked LEDs

FIG. 12 shows a flow chart of a process 1200 for controlling vertically stacked LEDs of a backlight, in accordance with some embodiments. Process 1200 can be performed by, for example, the controller 440 of an electronic display 155, as shown in FIG. 4. In other embodiments, some or all of the steps may be performed by other entities. In addition, some embodiments may perform the steps in parallel, perform the steps in different orders, or perform different steps. In some embodiments, process 1200 may be performed to provide a strobed backlight where light sources are flashed on and off over time to provide illumination to a LCD panel.

At 1210, the controller 440 is configured to determine a first emission spectrum of a first color LED of a vertical stack of color LEDs and a second emission spectrum of a second color LED of the vertical stack of color LEDs. The backlight may be a strobed backlight to reduce motion blur, where the color LEDs are switched on and off over time.

Two or more different color LEDs may be vertically stacked on top of each other. In some embodiments, the vertically stacked LEDs include different color LEDs, such as a red, green, and blue LED. As discussed above, different color LEDs may include different emission spectrums, where spectrum intensity varies as a function of wavelength as shown in FIG. 6B.

At 1220, the controller 440 is configured determine a first emission response time of the first color LED and a second emission response time of the second color LED. Emission response time refers to a delay between an input current and light emission output for an LED. Different color LEDs may include different emission response times.

At 1230, the controller 440 is configured to control the first emission spectrum of the first color LED relative to the second emission spectrum of the second color LED. The controller 440 may be configured to optimize an emission spectrum of combined light for the backlight based on separately controlling the emission spectrums of the color LEDs. The controller generates separate intensity control signals for each type of color LED. For example, the current input into a lower efficiency color LED may be higher than the current input into a higher efficiency color LED, where a higher current increases the intensity of the emission spectrum. Thus the quality of the combined light output from the backlight is improved in terms of color gamut and/or brightness. In some embodiments, the emission spectrum of color LEDs is optimized such that differently colored light sources emit light with similar intensity at corresponding wavelengths, as shown by the spectrum plots 660A, 660B, and 660C in FIG. 6.

At 1240, the controller 440 is configured to control the first emission response time of the first color LED relative to the second emission response time of the second LED. The controller 440 may balance the emission response times of the color LEDs based on separately controlling input signals to the color LEDs. The separate light intensity control signals for each type of color LED may include timing offsets to balance different emission response times. For example, an input current to a color LED with a longer emission response time may be provided at an earlier such that the timing of light emission output from the color LED matches the timing of light emission output from a second color LED having a shorter emission response time. Similarly, an input current to a color LED with a shorter emission response time may be provided at a later time such that the timing of light emission output from the color LED matches the timing of light emission output from a second color LED having a longer emission response time. In some embodiments, the controller 440 balances the emission response time for each of the vertically stacked color LEDs.

In that sense, intensity control signals output from the controller 440 compensates for emission spectrum and emission response time differences between different color LEDs, resulting in a backlight with improved color gamut and brightness.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A liquid crystal display (LCD) device, comprising:
an LCD panel;
a backlight for illuminating the LCD panel, the backlight including:
a plurality of light emitting diodes (LEDs) stacked vertically and disposed behind the LCD panel along one or more edges of the LCD panel, the plurality of LEDs including at least a first color LED and a second color LED emitting first light and second light at a first direction, respectively, at a first wavelength and a second wavelength, respectively, the first color LED including a first emission response time and the second color LED including a second emission response time that is different from the first emission response time; and
a light guide disposed behind the LCD panel and adjacent to the plurality of LEDs, the light guide configured to:
combine the first light and the second light received from the plurality of LEDs into combined light to illuminate the LCD panel; and
direct the combined light to the pixels of the LCD panel in a second direction; and
a controller configured to:
drive a lower efficiency color LED of the first and second color LEDs with a first current level and drive a higher efficiency color LED of the first and second color LEDs with a second current level lower than the first current level; and
drive the first color LED with a first pulsed signal and drive the second color LED with a second pulsed signal including a timing offset from the first pulsed signal to adjust for the first emission response time being different from the second emission response time and match timing of light emission output from the first color LED and the second color LED.

2. The LCD device of claim 1, wherein:
the plurality of LEDs includes a third color LED stacked with the first and second color LEDs.

3. The LCD device of claim 2, wherein:
the plurality of LEDs includes a fourth color LED stacked with the first, second, and third color LEDs;
the first color LED is a red LED, the second color LED is a green LED, the third color LED is a blue LED, and the fourth color LED is a blue LED.

4. The LCD device of claim 1, wherein the first color LED is included in a first LED assembly and the second color LED is included in a second LED assembly separate from the first LED assembly, and the first LED assembly and second LED assembly are stacked vertically.

5. The LCD device of claim 1, wherein both the first color LED and the second color LED are included in a single LED assembly.

6. The LCD device of claim 1, wherein the plurality of LEDs include a first array of LEDs vertically stacked with a second array of LEDs, the first array of LEDs stacked with an offset relative to the second array of LEDs.

7. The LCD device of claim 6, wherein the first array of LEDs and the second array of LEDs each includes first color LEDs and second color LEDs.

8. The LCD device of claim 6, wherein the first array of LEDs and the second array of LEDs each include a red LED, a green LED, and a blue LED.

9. The LCD device of claim 1, wherein:
the first light includes a first emission spectrum and the second light including a second emission spectrum different from the first emission spectrum; and
the controller is further configured to control an emission spectrum of the combined light based on controlling the first emission spectrum of the first color LED relative to the second emission spectrum of the second color LED.

10. A head mounted display (HMD), comprising:
a liquid crystal display (LCD) device, including:
an LCD panel;
a backlight for illuminating the LCD panel, the backlight including:
a plurality of light emitting diodes (LEDs) disposed behind the LCD panel along one or more edges of the LCD panel, the plurality of LEDs including at least a first color LED and a second color LED emitting first light and second light at a first direction, respectively, at a first wavelength and a second wavelength, respectively, the first color LED including a first emission response time and the second color LED including a second emission response time that is different from the first emission response time; and
a light guide disposed behind the LCD panel and adjacent to the plurality of LEDs, the light guide configured to:
combine the first light and the second light received from the plurality of LEDs into combined light to illuminate the LCD panel; and
direct the combined light to the pixels of the LCD panel in a second direction; and
a controller configured to:
drive a lower efficiency color LED of the first and second color LEDs with a first current level and drive a higher efficiency color LED of the first and second color LEDs with a second current level lower than the first current level; and
drive the first color LED with a first pulsed signal and drive the second color LED with a second pulsed signal including a timing offset from the first pulsed signal to adjust for the first emission response time being different from the second emission response time and match timing of light emission output from the first color LED and the second color LED.

11. The HMD of claim 10, wherein the plurality of LEDs include a first array of LEDs vertically stacked with a second array of LEDs with an offset between the first array and the second array such that centers of LEDs of the first array of LEDs align with spaces between adjacent LEDs of the second array LEDs, adjacent LEDs of the first array of LEDs being spaced apart by a distance and adjacent LEDs of the second array of LEDs being spaced apart by the distance.

12. The HMD of claim 10, wherein:
the plurality of LEDs includes a third color LED stacked with the first and second color LEDs.

13. The HMD of claim 12, wherein:
the plurality of LEDs includes a fourth color LED stacked with the first, second, and third color LEDs;
the first color LED is a red LED, the second color LED is a green LED, the third color LED is a blue LED, and the fourth color LED is a blue LED.

14. The HMD of claim 10, wherein the first color LED is included in a first LED assembly and the second color LED is included in a second LED assembly separate from the first LED assembly, and the first LED assembly and second LED assembly are stacked vertically.

15. The HMD of claim 10, wherein both the first color LED and the second color LED are included in a single LED assembly.

16. The HMD of claim 10, wherein the plurality of LEDs include a first array of LEDs vertically stacked with a second array of LEDs, the first array of LEDs stacked with an offset relative to the second array of LEDs.

17. The HMD of claim 16, wherein the first array of LEDs and the second array of LEDs each includes first color LEDs and second color LEDs.

18. The HMD of claim 16, wherein the first array of LEDs and the second array of LEDs each include a red LED, a green LED, and a blue LED.

19. The HMD of claim 10, wherein:
the first light includes a first emission spectrum and the second light including a second emission spectrum; and
the controller is further configured to control an emission spectrum of the combined light based on controlling the first emission spectrum of the first color LED relative to the second emission spectrum of the second color LED.

20. The LCD device of claim 1, wherein the plurality of LEDs include a first array of LEDs vertically stacked with a second array of LEDs with an offset between the first array and the second array such that centers of LEDs of the first array of LEDs align with spaces between adjacent LEDs of the second array LEDs, adjacent LEDs of the first array of LEDs being spaced apart by a distance and adjacent LEDs of the second array of LEDs being spaced apart by the distance.

* * * * *